United States Patent

Milford et al.

[15] 3,638,238

[45] Jan. 25, 1972

[54] MAGNETIC INK SYMBOL RECOGNITION SYSTEM WITH WAVESHAPES REPRESENTING DIRECT MAGNETIC FLUX

[72] Inventors: Richard E. Milford; Leland J. Hanchett, Jr., both of Phoenix, Ariz.

[73] Assignee: Honeywell Information Systems Inc.

[22] Filed: Aug. 12, 1969

[21] Appl. No.: 849,485

[52] U.S. Cl............340/146.3 C, 235/61.11 F, 235/61.11 D, 179/100.2 B, 324/41

[51] Int. Cl...........G06k 9/00

[58] Field of Search.......340/146.3; 235/61.114, 61.114 CR; 324/41; 179/100.2 B

[56] References Cited

UNITED STATES PATENTS

| | | | |
|---|---|---|---|
| 3,000,000 | 9/1961 | Eldredge | 340/146.3 |
| 3,221,303 | 11/1965 | Bradley | 340/146.3 |
| 3,439,337 | 4/1969 | Trimble | 340/146.3 |
| 3,188,611 | 6/1965 | Perotto | 340/146.3 |

OTHER PUBLICATIONS

IBM Tech. Disel Bull. Vol. 7 No. 5, October 1964: Staple Detector and Protection System, by Bond and Voss.

*Primary Examiner*—Thomas A. Robinson
*Attorney*—Edward W. Hughes and Fred Jacob

[57] ABSTRACT

A magnetic ink symbol recognition system for deriving characteristic waveshapes representing the total quantity of ink in each symbol thereby accurately recognizing symbols having printing imperfections.

17 Claims, 8 Drawing Figures

INVENTORS.
RICHARD E. MILFORD
LELAND J. HANCHETT, JR.

MAGNETIC INK SYMBOL RECOGNITION SYSTEM WITH WAVESHAPES REPRESENTING DIRECT MAGNETIC FLUX

BACKGROUND OF THE INVENTION

This invention relates to apparatus for automatically reading human language symbols which have been printed on a document with an ink capable of being magnetized and wherein each symbol is recognized by its characteristic waveshape which is produced when the symbol is moved relative to a reading head or transducer. In particular, the invention relates to apparatus for improving the recognition of symbols having printing imperfections and degradation.

FIELD OF THE INVENTION

The invention is particularly utilized in high-speed data-processing systems wherein information to be processed is supplied from an external source. This external source of information may be information-bearing mediums such as magnetic tapes, thermoplastic recording tapes, punched cards, and documents bearing magnetic ink imprints, optically recognizable coded imprints and machine or hand recorded marks.

In practice, it has been found that the printed symbols formed with strokes inevitably vary from their ideal form including variations in the density of the magnetic ink, voids in the printed area, variations in the widths of the strokes, nonuniformity of the edges of printed areas or strokes, and misalignment or skew of the symbol with respect to the document or transducer slit. These variations can cause erroneous signals as well as voids in the signal pattern.

It is also found that documents become spattered with ink particles during the printing process and that magnetic wastes such as iron particles become imbedded in the documents when they are manufactured. When the documents are transported past the transducer, the transport mechanism located in close proximity to the transducer may have such magnetic particles deposited on it. Such extraneous magnetic particles cause corresponding spurious signals in the transducer.

Generally, a waveshape, produced by the transducer scanning a symbol having printing variations and a document having extraneous magnetic material or particles, is different from the waveshape derived from any of the undistorted symbols and it constitutes an improper or distorted configuration. This distorted configuration or waveshape may be recognized incorrectly as two or more symbols but should be recognized as an error and the document rejected.

The waveshape may be distorted so that it appears to the recognition system as the waveshape of a different symbol from that read resulting in an incorrect output called a "-misread." Extraneous magnetic material which is isolated on a document may also initiate timing for starting recognition and incorrect detection of a false symbol resulting in a reject or a misread, although the quantity of magnetic material is less than that normally contained in a printed symbol.

Accordingly, it is desirable to provide a system wherein the effect of any, or all, of the foregoing described conditions are eliminated or reduced. It is also desirable to inhibit recognition upon detecting an insufficient quantity of magnetic ink.

DESCRIPTION OF THE PRIOR ART

One prior art system for automatically recognizing symbols written in human language with magnetic ink is disclosed in a U.S. Pat. No. 2,924,812, issued Feb. 19, 1960 to P. E. Merritt and C. M. Steel for an AUTOMATIC READING SYSTEM. In that system, a "correlation recognition system," the symbols are magnetized with a permanent magnet or an electromagnet energized by a direct current providing a constant magnetizing flux. Symbols magnetized in this manner are hereinafter referred to as being "DC magnetized." The symbols are then scanned or moved in sequence past an electromagnetic transducer or reading head formed with a single transverse slit or gap. The transducer responds to the rate of change of magnetic flux $d\phi/dt$ of a narrow transverse portion of each symbol as it is scanned to generate a distinctive waveshape having a voltage variable amplitude or pattern of voltages for each symbol. The rate of change of magnetic flux is a maximum at the vertical edges of each stroke forming a symbol and produces a waveshape having peaks of opposite polarity at the leading and trailing edges of the vertical strokes.

The waveshape is then applied to a wave transmission means in the form of a delay line having a plurality of time-spaced sampling taps for detecting the voltage at points along the waveshape corresponding to the edges of the strokes.

For recognition of each waveshape associated with each symbol, a "correlation recognition system" having a plurality of symbol recognition channels, one for each of the waveshapes to be recognized, is connected to the sampling taps. Each of the channels is adapted to produce an output signal on a lead when the corresponding waveshape is in a predetermined position in the delay line, and is adapted to produce an output signal having an amplitude greater than that produced by any other of the channels when the corresponding waveshape is applied to the recognition system. Amplitude sensing apparatus is provided for sampling the output signals of all the channels to detect the output signal having the greatest amplitude and in response thereto to deliver a signal on the output lead corresponding to the symbol being scanned.

A symbol presence timing circuit is provided which is responsive to the leading portion of a waveshape to produce a "sample signal" when the waveshape reaches a predetermined or sampling position in the delay line. The sample signal is applied to a gated output circuit from the correlation symbol recognition system and a symbol signal is produced on a lead corresponding to the detected symbol. The symbol presence timing circuit relies on having leading portions of equal amplitude for each waveshape to provide uniform timing.

Another prior art recognition system is termed a "difference or feature recognition system." In this system, symbols are recognized according to distinguishing features of a waveshape by comparing signal samples from sets of different sampling taps to determine the symbol being scanned rather than by detecting which waveshape provides the greatest amplitude from a correlation network.

Both the correlation and difference recognition systems detect changes in magnetic flux $d\phi/dt$ of transverse portions of the symbols which are subject to change in position due to printing variations in ink density, in stroke width, in skew, in edges of printed areas and in speed of movement of the symbol relative to the transducer. Thus, the prior art symbol recognition systems are susceptible to incidents of incorrect symbol recognition and rejection of documents due to the printing variations and extraneous magnetic particles as previously described.

Additionally, the prior art systems do not provide for uniform initiation of timing circuits when different leading portion amplitudes are employed. Also, the prior art systems do not adequately inhibit false character initiation due to small extraneous magnetic particles.

It is, therefore, desirable to have a recognition system with improved reliability and accuracy wherein there is no rejection of recognizable data merely because the document contains magnetic irregularities of the forms described.

SUMMARY OF THE INVENTION

In accordance with the invention claimed, a symbol recognition system is provided which generates waveshapes representing the direct or total quantity of ink sensed in a symbol. The recognition system utilizes these waveshapes representing the total quantity of ink of a symbol to effectively reduce incorrect symbol recognition and document rejects caused by printing variations, extraneous magnetic material and the occurrence of premature timing effects heretofore described.

One form of the invention provides DC magnetization of the symbols and means for integrating the change of flux $d\phi/dt$ signal from a transducer or sensing means having a single transverse slit to derive a waveshape representing the total quantity of ink sensed for a symbol. The waveshape is then recognized by a combination of correlation and feature recognition systems which operate on stroke centerline, rather than edge, information. Since the stroke centerlines of the direct quantity ink waveshapes are relatively invariant to stroke width and edge variations caused by printing variations, misreads and rejects due to variable width strokes, uneven edges, skew and variations in speed are reduced.

The feature recognition system checks specific features of selected symbols or groups of symbols to produce test signals. The test signals cause selection of a correct one of a plurality of symbol signals by inhibiting recognition of an incorrect symbol or cause rejection of the document when only incorrect symbol signals have been provided. Accordingly, this testing function reduces incorrect recognition of symbols by verifying whether symbol signals are correct. The number of distorted waveshapes is also reduced by detecting extraneous magnetic particles.

Further, the derived waveshape permits measurement of the quantity of ink in each symbol by a test channel which provides a level signal for each symbol for comparison with a stored level signal provided by an immediately preceding symbol. This comparison test detects large voids in symbols caused by document damage or erasure, which may generate distorted waveshapes.

An ink signal representing a threshold level in conjunction with the occurrence of the leading portion of a waveshape entering the delay line is employed to prevent premature initiation of a sampling signal. This ink signal is further employed to inhibit false initiation of a character signal by isolated magnetic ink particles.

Another signal provides for detecting extraneous magnetic particles adhering to a document transport mechanism located in close proximity to the transducer by producing a noise indicator signal for use by data-processing circuits.

It is, therefore, an object of this invention to provide an improved and more accurate recognition system for symbols printed in magnetizable ink.

A further object of this invention is to provide apparatus for recognizing the quantity of magnetizable ink in each symbol printed on the document.

A still further object of this invention is to provide a symbol recognition system having uniform timing for recognition of each symbol.

A still further object of this invention is to provide a symbol recognition system having apparatus for inhibiting character initiation if the quantity of magnetizable material is below a minimum level.

A still further object of this invention is to compare the level of each character with the level of the preceding character in order to prevent misreading symbols with gross voids in the printing.

Still another object of this invention is to provide a symbol recognition system having apparatus for detecting extraneous magnetic particles adhering to document handling apparatus in close proximity with a symbol reading transducer.

Further objects and advantages of the present invention will become apparent to those skilled in the art as the description thereof proceeds.

BRIEF DESCRIPTION OF THE DRAWING

The present invention may be more readily described by reference to the accompanying drawing in which.

DETAILED DESCRIPTION OF OPERATION

Figure 1:
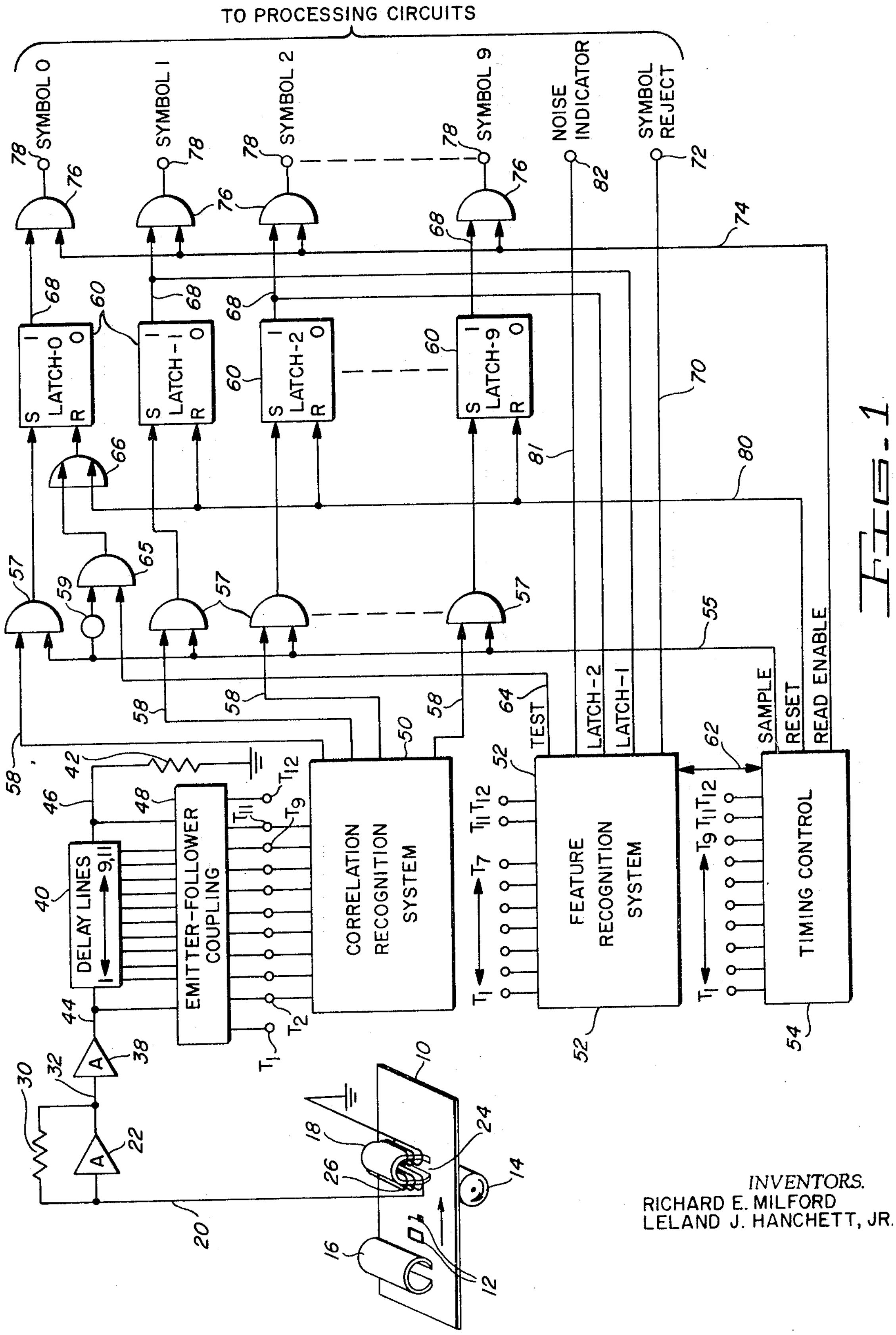
FIG. 1 illustrates a reading station and system configuration of the invention.
Figure 2:
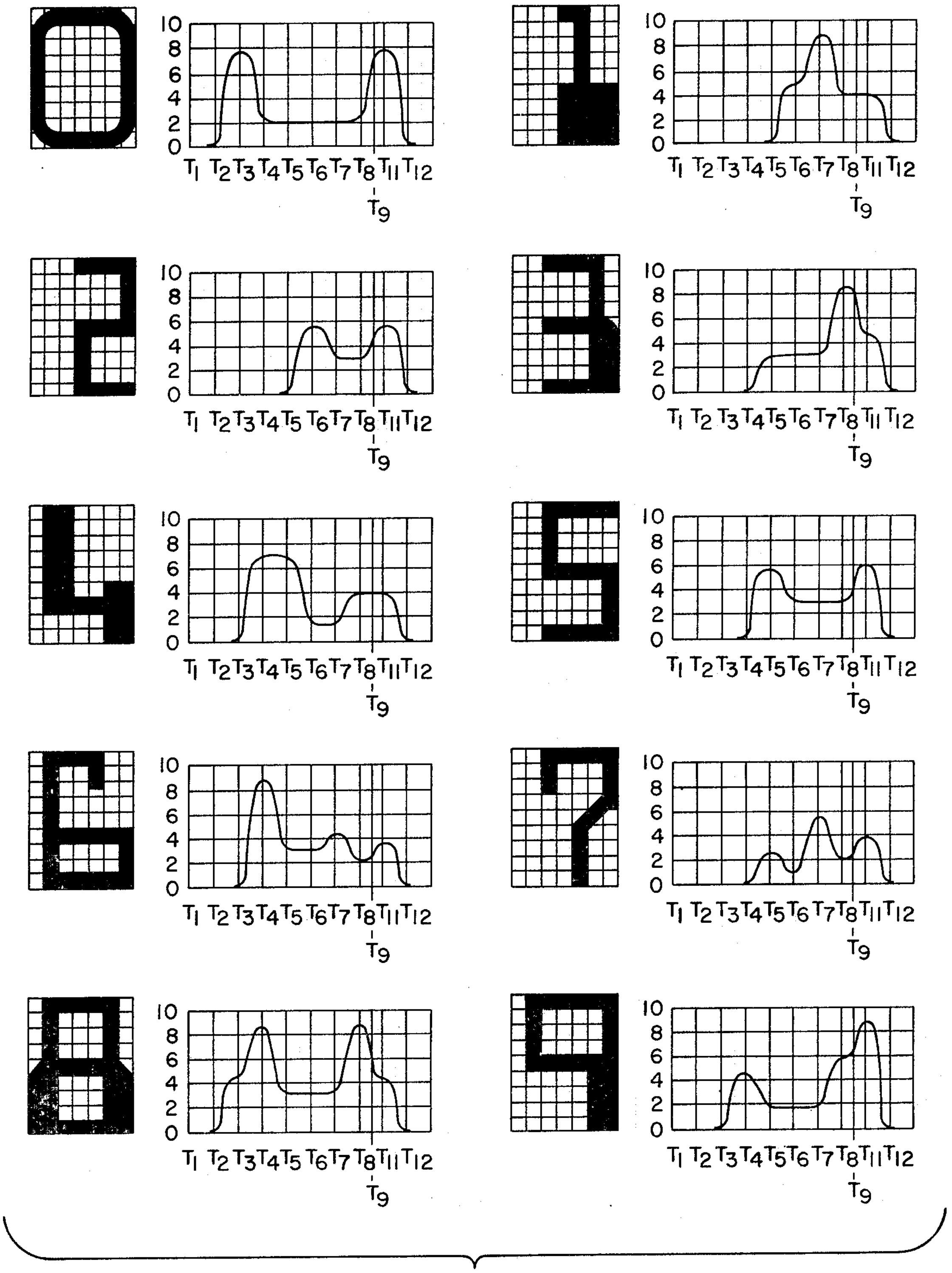
FIG. 2 illustrates ten symbols adapted to be employed with the embodiment of this invention and their corresponding waveshapes.

FIG. 1 illustrates a document 10 bearing a plurality of symbols 12 printed in magnetic ink. A plurality of magnetically recognizable symbols 12 suitable for employment with the invention are illustrated in FIG. 2. While only numeric symbols are illustrated, it is to be understood that other symbols may be employed.

The document is moved to the right, as indicated in FIG. 1, by a mechanism comprising a roller 14, for reading the symbols. The symbols first pass adjacent a magnetizing magnet 16, illustrated as a permanent magnet, which magnetizes the magnetic material of a document so that signals are produced when the material passes adjacent a reading transducer 18. The characteristic waveshape of the symbol which is produced by transducer 18 when a symbol passes adjacent thereto is fed via a lead 20 to the input terminal of an amplifier 22.

Transducer 18 has a single transverse slit 24 and an inductance coil 26 for generating input signals onto lead 20 in response to the magnetized ink comprising the symbols 12. Amplifier 22 has a resistor 30 connected in parallel between its output and input terminals to provide negative feedback effects.

The combination of inductance coil 26, amplifier 22 and resistor 30 provides a circuit for integrating the $d\phi/dt$ waveshapes representing a magnetized symbol or the quantity of ink in a symbol being scanned.

The transducer slit, for example, may have a width of 0.0027 to 0.0035 inch, the inductance coil an inductance of 130 millihenries and the feedback resistor a resistance of 196kΩ for use with amplifier 22. The resulting configuration is a well-known R–L integrator circuit shown by Thomas L. Martin, Jr. in FIG. 1.31 of *High Frequency Engineering*, Prentice-Hall, Inc., New York, 1950.

Figure 3:
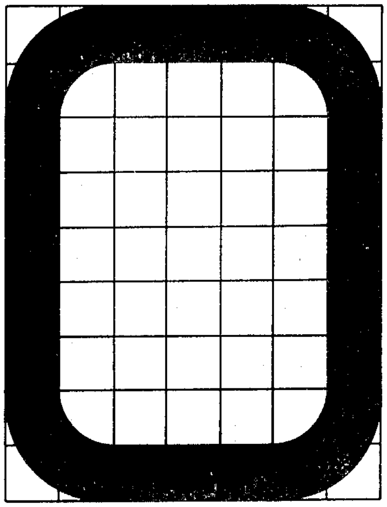
FIG. 3 is a graphic representation of the numeral "0" which when magnetized may be recognized by the present invention.
Figure 4:
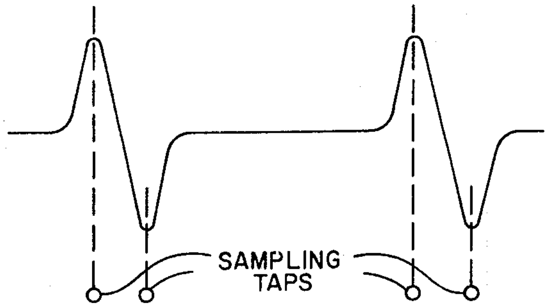
FIG. 4 is the electrical waveshape generated by scanning the magnetized symbol of FIG. 3 with an electromagnetic transducer in a prior art symbol recognition system.
Figure 5:
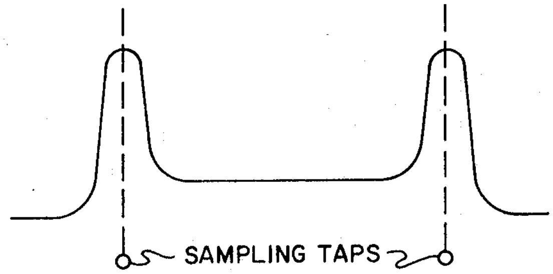
FIG. 5 is the electrical waveshape generated by scanning the magnetized symbol of FIG. 3 with the electromagnetic transducer and integration circuit of the present invention.

With reference to FIGS. 3, 4 and 5, it is seen that symbol 0 when being scanned by transducer 18 produces a waveshape represented by the $d\phi/dt$ waveshape of FIG. 4 wherein a peak appears at each of the edges of a vertical stroke of the symbol. In the prior art, sampling taps were located at delay line taps corresponding to each of the peaks to provide for correlation recognition or difference recognition as previously described. The position of these peaks is subject to change with printing defects, such as variable width strokes and ragged edges, not clearly discernible.

In accordance with the present invention a waveshape representing the rate of change in flux as shown in FIG. 5 is provided which represents the quantity of ink in the symbol. The sampling taps illustrated in FIG. 5 are provided at the centerlines of each integrated area having a peak. The centerlines of each integrated area corresponding to the vertical stroke of the symbols are relatively invariant to stroke width variation and ragged edges due to printing and therefore a waveshape is provided for recognition, which is less variant to printing imperfections.

A characteristic waveshape representing the direct quantity of ink in each symbol is thereby provided on lead 32 which is then passed by amplifier 38 to a delay line 40 where the waveshape is stored as a traveling wave. The delay line is terminated by a resistor 42 having a resistance equal to the value of the characteristic impedance of the delay line so that there will be no reflection of successive voltage amplitudes.

The delay line is provided with eight equally spaced sampling taps coupled to terminals $T_2$ to $T_8$ and $T_{11}$ by an emitter-follower coupling circuit 48. A ninth tap, intermediate the seventh and eighth taps, is also coupled to a terminal $T_9$ by the emitter-follower coupling circuit. Each voltage amplitude of the waveshape produced by the transducer is stored in the delay line such that when the entire waveshape has been produced it is stored as a traveling wave which can be simultaneously sampled at several points.

Graphs of traveling waves corresponding to waveshapes produced by sensing symbols 0 through 9 on the document of FIG. 1 are shown in FIG. 2. The waves are depicted at the time when the leading portion of the waveshape has initiated a signal presence timing circuit for recognition of the waveshape at a predetermined position in the delay line. The corresponding voltage amplitude at each terminal is plotted as the ordinate, but it should be noted that the voltage amplitude is arbitrary. Accordingly, the ordinates have been assigned units of voltage corresponding to the number of squares of ink at each terminal because, as it will presently be seen, only relative voltages are important. The abscissas of the graphs are the terminals $T_2$ to $T_9$, and $T_{11}$ coupled to the delay line and $T_1$ and $T_{12}$ coupled to leads 44 and 46 leading to and from the delay lines, respectively.

When the waveshapes of the symbols are stored as traveling waves in the delay line in the position defined by the respective graphs of FIG. 2, they are stored in a position referred to as the reference position. If other waveshapes were to be recognized, the reference position for each would similarly be defined as that position in the delay line when a corresponding leading portion voltage is present to initiate signal presence timing. Continuously changing signal samples of the traveling wave are presented at the terminals $T_2$, $T_3$, $T_4$, $T_5$, $T_6$, $T_7$, $T_8$, $T_9$ and $T_{11}$ but, as will be more fully explained, only those signal samples present at terminals $T_2$, $T_3$, $T_4$, $T_5$, $T_6$, $T_7$, $T_8$ and $T_{11}$ when the waveshape to be recognized is in the reference position are important.

Sampling taps $T_1$ and $T_{12}$ are external to the delay line and provide sampling signals which will be utilized as described hereinafter with reference to the correlation and feature recognition systems 50 and 52, respectively, and timing control logic block 54. Certain of the signals which appear at terminals $T_1$ to $T_9$, $T_{11}$ and $T_{12}$ are applied simultaneously to the correlation and feature recognition systems for recognition of the different symbols.

A correlation recognition system for reading magnetic symbols is disclosed in U.S. Pat. No. 3,111,645, issued Nov. 19, 1963, to R. E. Milford for a Waveform Recognition System and to which reference is hereby made for a detailed description thereof.

Briefly, the correlation recognition system includes a plurality of circuits, each having a correlation network, which is operable to produce an output greater than the output of any other correlation circuits when the waveshape of the symbol corresponding to the correlation circuit is sampled in the delay line. In other words, when a waveshape is sampled, the highest amplitude output signal from the correlation circuits is produced by the circuit having a sample waveshape most nearly similar to the one being tested.

The correlation recognition system operates in accordance with the aforementioned U.S. Pat. No. 3,111,645 to provide an output signal on one of the output leads corresponding to the symbol whose waveshape is recognized. It is to be understood that there is a separate correlation circuit corresponding to each of the symbols to be recognized.

The signals which appear at certain of the terminals $T_1$ to $T_9$, $T_{11}$ and $T_{12}$ are applied simultaneously to the correlation and feature recognition systems 50 and 52, respectively, and timing control logic block 54 for use in a manner to be described. The feature recognition system is designed to recognize distinguishing features of each symbol waveshape such that its output may certify correct symbol recognition.

Briefly, the feature recognition system includes a plurality of test channels, each channel including a test network which tests for distinguishing waveshape characteristics and produces a high or enabling TEST signal when a feature of a first symbol is recognized and a high or enabling TEST NOT signal when a feature of a second symbol is recognized. For example, if a symbol 1 were recognized by correlation, the TEST signal should be high and if a symbol 0 were recognized by correlation, the TEST NOT signal should be high. The test channel may also simultaneously test for distinguishing characteristics of a plurality of symbols and should produce the high or enabling TEST signal when any symbol of a first group such as a 1 or a 6 is recognized and the high or enabling TEST NOT signal when any symbol of a second group such as a 0 or a 2 or a 5 is recognized.

Figure 6:
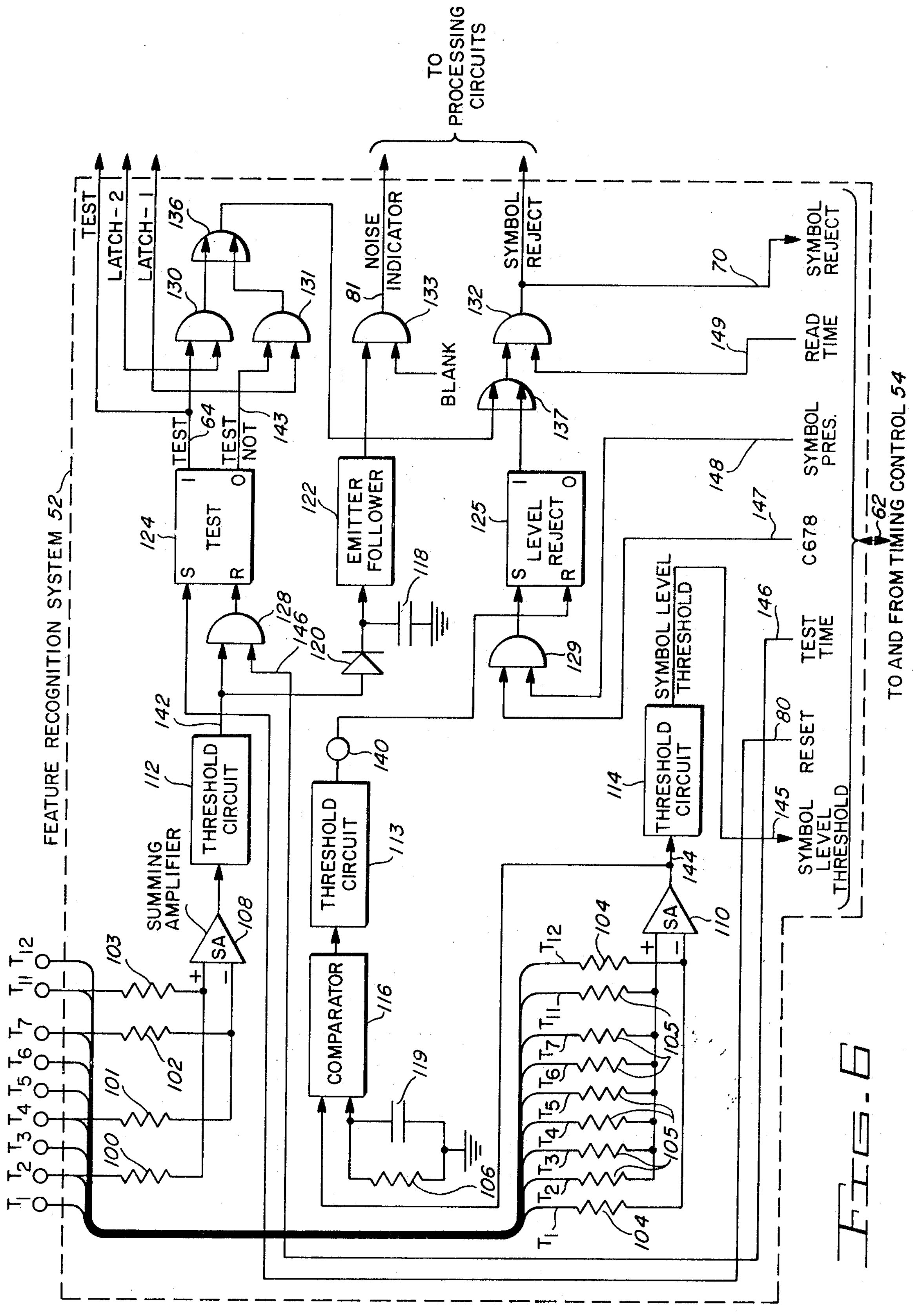
FIG. 6 is a schematic of the feature recognition system of FIG. 1.

As illustrated in FIG. 6 each of the feature or symbol test channels is depicted as comprising a respective one of a plurality of summing amplifiers and a respective one of a plurality of threshold circuits. For purposes of illustration only one such channel is shown in FIG. 6. However, it is to be understood that there may be a separate feature test channel corresponding to each of the separate characteristics to be tested. Operation of the symbol test channel will be described more fully hereinafter.

Figure 7:
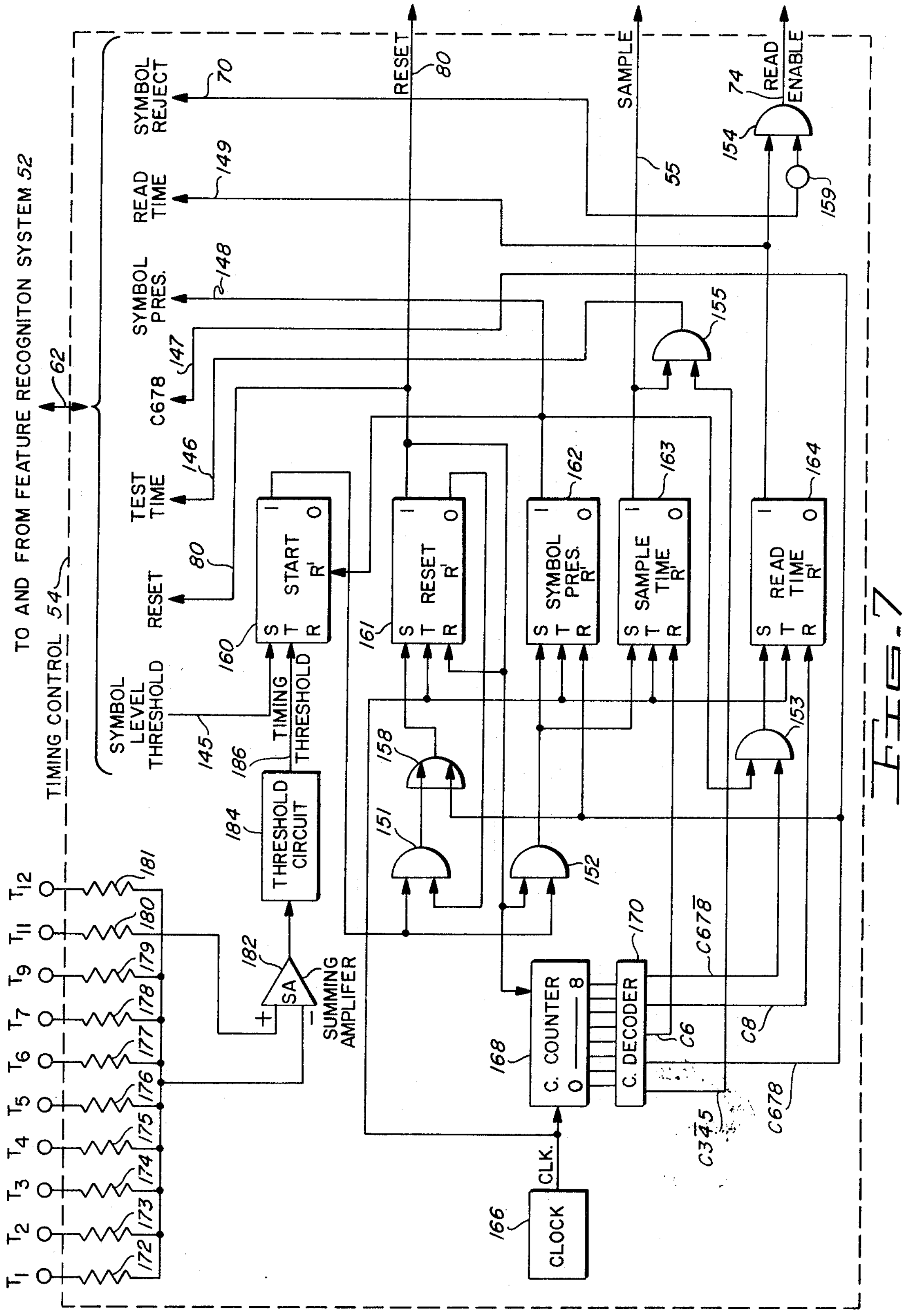
FIG. 7 is a schematic of the timing control logic of FIG. 1.

When a waveshape is substantially at the reference position a sample signal is generated by a timing control logic block 54, FIG. 7. Logic block 54 receives signals which appear at certain of the terminals $T_1$ to $T_9$, $T_{11}$ and $T_{12}$ of the delay line as indicated in FIG. 1 and it functions to detect when a waveshape reaches a predetermined position in the delay line and to develop a high or enabling sample signal at a time in relation thereto.

With reference to FIG. 1, the SAMPLE signal is applied over lead 55 simultaneously to each of AND-gates 57 to permit high or enabling signals on leads 58 representing a recognized waveshape by the correlation recognition system to be applied to an S input terminal of a corresponding one of bistable or flip-flop storage elements 60. Bistable storage elements 60 are identified as LATCH-0 through LATCH-9 corresponding to a respective recognized symbol and may be, for example, well-known flip-flops. Each bistable element stores a signal corresponding to one of the symbols to be recognized by the recognition system.

The timing control logic block, FIG. 7, is comprised of a timing channel for detecting the presence of a waveshape at the reference position in the delay line and responds to the presence of the waveshape by initiating timing for the correlation recognition system and application of the TEST and TEST NOT signals provided by the feature recognition system.

Briefly, the timing control logic block 54 and feature recognition system 52 of FIG. 1 exchange control signals by means of a plurality of leads within cable 62. A timing signal is applied to the feature recognition system to provide for developing a feature TEST signal on lead 64 for applying to AND-gate 65. When a test by the feature recognition system indicates that a feature of symbol 0 has not been recognized, the TEST signal is high. The inverted SAMPLE signal from an inverter 59 is applied to AND-gate 65. Thus, when a high or enabling TEST signal recognizes a feature characteristic of symbol 1, OR-gate 66 is enabled to provide a high or enabling output signal to the R input terminal of LATCH-0 at the end of a given SAMPLE time representing a low or disabling SAMPLE signal. The high or enabling output signal at the R input resets the LATCH-0 bistable element thereby inhibiting recognition of a symbol 0 based on the feature recognition system TEST signal.

Following application of the SAMPLE signal to gates 57 LATCH-1 and LATCH-2 bistable elements will be in a first or set state or a second or reset state. The bistable elements in a set state will provide a high or enabling signal on their respective output leads 68 for transmission to the feature recognition system. When a high or enabling LATCH-2 signal is present on a corresponding lead 68 and the TEST signal is high indicating recognition of a feature of symbol 1, the feature recognition system will generate a high or enabling SYMBOL REJECT signal at terminal 72. In a similar manner a high or enabling SYMBOL REJECT signal will be provided when a high or enabling LATCH-1 signal is present on a corresponding lead 68 and a high TEST NOT feature signal is present indicating that a feature of symbol 2 has been recognized. Thus, the feature recognition system provides for a SYMBOL REJECT signal to processing circuits for use to control rejecting a document when the feature test and the correlation recognition system output signals do not agree.

After a predetermined time delay, if no SYMBOL REJECT signal is provided, the timing control logic block provides a high or enabling READ ENABLE signal on lead 74. The signal on lead 74 is applied to one input terminal of each of gates 76 to enable the one and only gate corresponding to the bistable element 60 which is in a set state, thereby providing a high or enabling signal on a corresponding terminal 78. It is to be noted that separate logic, not shown, and not material to the instant invention, provides a SYMBOL REJECT signal if no bistable element is set or if more than one bistable element is set. The high or enabling signal on one of terminals 78 provides a corresponding one of SYMBOL 0 through SYMBOL 9 signals to processing circuits representing the symbol which has been recognized.

Again after a predetermined timing interval, the timing control logic block provides a high or enabling RESET signal on lead 80 through OR-gate 66 to the R input terminal of the LATCH-0 bistable element and directly to the R input terminals of LATCH-1 through LATCH-9 bistable elements to place each bistable element in a reset state prior to a next symbol recognition operation.

After a document has passed the reading station, the feature recognition system uses a symbol test channel output to detect the presence of extraneous magnetic particles on roller 14. Roller 14 is, for example, positioned opposite transducer 18 such that each document having symbols printed thereon for recognition is moved between the transducer and roller. When a document is not present the symbol test channel continues to detect a waveshape and generates a NOISE INDICATOR signal at terminal 82. The NOISE INDICATOR signal is thus available for detecting and indicating extraneous magnetic particles on the roller or transport mechanism in the proximity of the transducer.

The feature recognition system also provides the SYMBOL REJECT signal at terminal 72 for a level test indicating that a symbol has insufficient ink compared with a preceding symbol having a normal quantity of ink.

Figure 8:
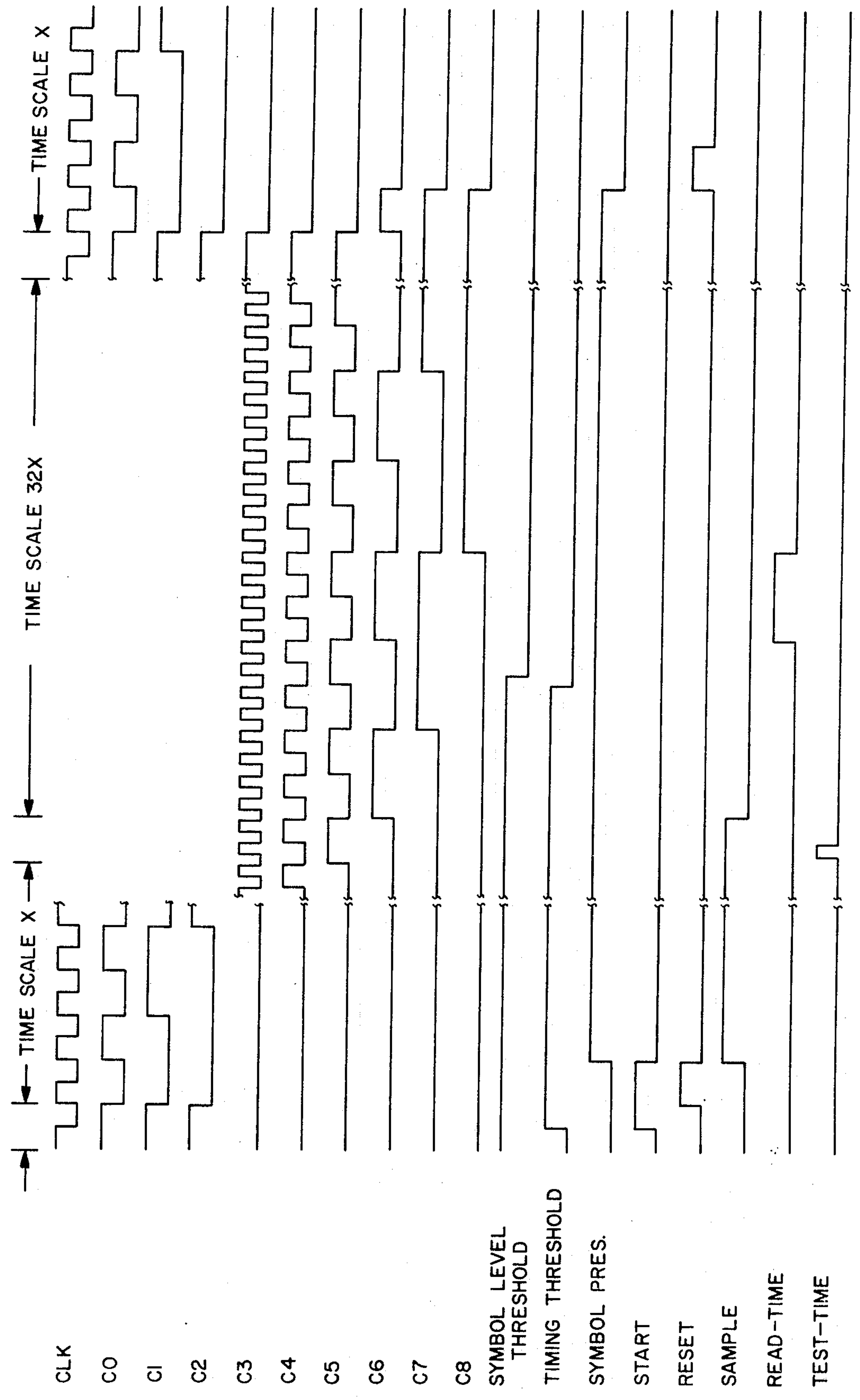
FIG. 8 illustrates waveshapes of the control signals transmitted during operation of the logic of FIGS. 1, 6 and 7.

Operation of the overall system of FIG. 1 is illustrated in FIG. 8 which shows a sequence of signals representing a cycle of operation during the recognition of each symbol. A detailed description of the operation will be described hereinafter in accordance with a timed sequence of signals generated within timing control logic block 54.

FEATURE RECOGNITION

Referring now to FIG. 6, a feature recognition circuit is illustrated comprising resistors 100–106, summing amplifiers 108 and 110, a plurality of threshold circuits 112–114, a comparator 116, capacitors 118 and 119, diode 120, emitter follower 122, bistable elements 124 and 125, a plurality of AND-gates 128–133, OR-gates 136 and 137 and inverter 140.

Certain signals at sampling taps $T_2$, $T_3$, $T_4$, $T_5$, $T_6$, $T_7$, $T_9$, $T_{11}$ and $T_{12}$ of FIG. 1 are applied to a plurality of test channels in the feature recognition system for determining characteristics of given symbols recognized by the system. Although a plurality of feature test channels are utilized for various tests, only one has been shown in FIG. 6. Operation of a typical test channel for testing characteristic features of symbols 0, 1, 2, 5 and 6 will now be described.

In FIG. 6 a symbol test channel is illustrated comprising a test matrix having impedance means in the form of resistors 100–103, summing amplifier 108, threshold circuit 112, bistable element 124, AND-gates 128 and 130–132, and OR-gates 136 and 137. Resistors 100–103 are connected between terminals $T_2$, $T_4$, $T_7$ and $T_{11}$, respectively, and the positive and negative input terminals of summing amplifier 108.

Summing amplifier 108 then provides a positive or negative polarity analog output signal depending upon the characteristic feature being detected from a waveshape representing one of the five symbols previously mentioned. The analog output signal from the summing amplifier becomes positive following a zero crossover point and is applied to threshold circuit 112, which in turn provides a digital output signal on lead 142 to one input terminal of AND-gate 128. AND-gate 128 is enabled by the conjunctive application of a positive or enabling signal from threshold circuit 112 and a signal identified as TEST TIME on lead 146 from timing control 54.

The test matrix may be designed, for example, such that resistors 100 and 103 are connected between terminals $T_2$ and $T_{11}$, respectively, and the positive input terminal of the summing amplifier 108, and resistors 101 and 102 are connected between terminals $T_4$ and $T_7$ and the negative input terminal of summing amplifier 108. Resistors 100–103 have a resistance value selected such that when a 0, 2 or 5 are detected the output signal of the threshold circuit would be a high or enabling level and when detecting a 1 or 6 the output signal of the threshold circuit would be a low or disabling signal. The table below identifies relative signal samples of representative quantities of ink for printed symbols 0, 1, 2, 5 and 6 at the various sampling taps $T_2$–$T_8$, and $T_{11}$ as determined from the graphs of FIG. 2.

TABLE I

Relative Signal Samples

| Printed Symbol | $T_2$ | $T_3$ | $T_4$ | $T_5$ | $T_6$ | $T_7$ | $T_8$ | $T_{11}$ |
|---|---|---|---|---|---|---|---|---|
| 0 | 0 | 8 | 2 | 2 | 2 | 2 | 2 | 8 |
| 1 | 0 | 0 | 0 | 0 | 5 | 9 | 4 | 4 |
| 2 | 0 | 0 | 0 | 0 | 6 | 3 | 3 | 6 |
| 5 | 0 | 0 | 0 | 6 | 3 | 3 | 3 | 6 |
| 6 | 0 | 0 | 9 | | 3 | 4½ | 2 | 4 |

With reference to FIG. 2, the relative signal sample values shown in table I have been obtained by determining the direct quantity of ink corresponding to each symbol. The quantity of ink is in accordance with the number of squares identified in the graphs of FIG. 2 and plotted as waveshapes having ordinates corresponding to the number of vertical squares and various sampling taps as abscissas.

With reference to table I, it is observed that for symbol 2, tap $T_{11}$ has a quantity of ink represented by the numeral 6. This is selected as being a characteristic feature of symbol 2, and, therefore, an impedance means such as resistor 103 is connected between $T_{11}$ and the positive input of the summing amplifier 108 so as to provide a positive output signal from the amplifier 108 for a 2 symbol. Tap $T_7$ has a characteristic signal representative of the numeral 9 for the symbol 1. An impedance means such as resistor 102 is connected between tap $T_7$ and the negative input terminal of amplifier 108 to provide a negative output signal from amplifier 108 for a symbol 1. For equal print degradation the equation for calculating the resistance values for resistors 103 and 102, identified in the equation as $R_1$ and $R_2$, respectively, is as follows:

$$+\text{test output } 2 = -\text{test output } 1$$

$$+(6/R_1) - (3/R_2) = -(4/R_1) + (9/R_2$$

$$10/R_1 = 12/R_2$$

$$R_2/R_1 = 1.2$$

A suitable summing amplifier may have, by way of example, a gain of approximately 1 and employ a feedback resistor of approximately 50 kΩ to provide the desired output gain $R_1$ or resistor 103 is selected as being equal to 50 kΩ. $R_2$ or resistor 102 is then calculated as being equal to 60 kΩ.

In a similar manner impedance means may be selected such that characteristic features of symbols 6 and 5 provide a negative and a positive output, respectively, from summing amplifier 108. As noted from the table, symbols 6 and 5 have signal samples 9 and 0 at tap $T_4$, respectively. The equation for calculating the proper resistance value connected between tap $T_4$ and the negative input terminal of the summing amplifier is as follows wherein resistor 101 is identified as $R_3$:

$$+\text{test output } 5 = -\text{test output } 6$$
$$(6/50k)-(3/60k)-(0/R_3)=-(4/50k)+(4.5/60k)+(9/R_3)$$
$$(10/50k)\ (7.5/60k)=(9/R_3)$$
$$R_3=120\ k\Omega$$

In order to balance the summing amplifier and cancel DC and low frequency noise variations, the sum of the conductances must equal 0. Therefore, the following equation is used to calculate a value of resistance for resistor 100 in which resistor 100 is identified as $R_4$:

$$0=(1/R_4)+(1/50k)-(1/60k)-(1/120k)$$
$$R_4=200\ k\Omega$$

Thus, summing amplifier 108 provides a positive output signal for a first group of symbols 5 and 2 and a negative output for a second group of symbols 1 and 6. Since symbol 0 also produces a reliable positive output, the same test may also include symbol 0. Thus, the illustrated feature test channel provides a test for a feature of symbols 0, 1, 2, 5 and 6.

One example of a suitable summing amplifier is disclosed in a U.S. Pat. No. 3,148,336, issued Sept. 8, 1964 to R. E. Milford for a Current Amplifier Providing The Sum Of Absolute Values Of Signals.

The output signal of summing amplifier 108 is applied to threshold circuit 112 which may be a well-known Schmitt trigger circuit producing an output voltage of given level in response to input voltages which exceed a predetermined threshold level. A TEST MATRIX output or feature signal from threshold circuit 112 on lead 142 is applied to one input terminal of AND-gate 128 which is enabled when enabling TEST MATRIX feature signal is applied in conjunction with an enabling TEST TIME signal on lead 146. Enabled gate 128 then provides an enabling signal to the R input terminal of a TEST bistable element 124 of FIG. 6. Following the TEST TIME signal, an enabling TEST or TEST NOT signal is present on leads 64 or 143, respectively, to provide for testing output signals provided by the correlation recognition system.

The TEST bistable element 124 in a reset state provides a low or disabling TEST signal on lead 64 to one input terminal of AND-gate 130 and a high or enabling TEST NOT signal on lead 143 from the 0 output terminal of TEST bistable element 124 to one input terminal of AND-gate 131.

When TEST bistable element 124 is in a reset state indicating recognition of a symbol 0, 2 or 5, the enabling TEST NOT signal from the 0 output terminal of bistable element 124 which is applied to one input terminal of AND-gate 131 in conjunction with a high or enabling signal from LATCH-1 (bistable element 60) provides for a SYMBOL REJECT signal indicating incorrect recognition of a symbol-1. AND-gate 131 when enabled provides a high or enabling signal to enable OR-gate 136 which in turn provides a high or enabling signal to one input terminal of AND-gate 132. AND-gate 132 is enabled when a READ TIME signal is provided on lead 149 from READ TIME bistable element 164 to provide a SYMBOL REJECT signal to terminal 72.

In a similar manner, when TEST bistable element 124 is in a set state, indicating recognition of a symbol 1 or 6, the high or enabling TEST signal from its 1 output terminal is applied to one of the input terminals of AND-gate 130 in conjunction with a high or enabling LATCH-2 signal from bistable element 60 and provides a SYMBOL REJECT output signal indicating incorrect recognition of a symbol 2. AND-gates 130 and 131 provide for rejecting documents when the correlation recognition system 50 incorrectly recognizes symbols.

EXTRANEOUS MAGNETIC PARTICLE RECOGNITION

The TEST MATRIX or feature signal from threshold circuit 112 of the symbol test channel is in a similar manner applied to a pulse stretcher circuit comprising a diode 120, capacitor 118, and emitter follower circuit 122, as shown in FIG. 6, as a particle signal indicating the presence of extraneous magnetic particles on roller 14 of FIG. 1. One example of a suitable emitter follower circuit is shown and described by J. Millman and H. Taub in Chapter 8, FIG. 8–35, pp 302–303 of "Pulse Digital and Stretcher Waveforms," McGraw-Hill Book Company, 1965. The time constant for the pulse stretcher circuit may be calculated by using the well-known equation $T=RC$, where T is time in seconds, R is resistance in ohms and C is capacitance in farads. By employing values of 0.082 microfarads and 500 kΩ for capacitor 118 and an impedance for an input circuit to emitter follower circuit 122, a high or enabling output signal is provided from circuit 122 having a duration of approximately 40 milliseconds for each high or enabling signal from circuit 112. The output from circuit 122 is applied to one input terminal of AND-gate 133 and a BLANK signal applied to its second input terminal. When high or enabling input signals are present on both input terminals, AND-gate 133 provides a NOISE INDICATOR signal on lead 81 for transmittal to processing circuits, which may be driver and indicator lamps.

The BLANK signal is generated by a well-known means such as a photocell, not shown, which is provided to detect passage of a document from the reading station and to produce a signal designated as BLANK when the recognition system is not reading symbols from a document.

AND-gate 133 is enabled by the output signal from threshold circuit 112 via the pulse stretcher circuit at the time a document is not being moved between transducer 18 and roller 14, thereby providing spurious signals to the transducer indicating magnetic particles of an extraneous nature which have adhered to roller 14. Enabled gate 133 provides an enabling NOISE INDICATOR signal which may be utilized for alerting an operator that the roller is to be cleaned or that other necessary corrective action should be taken.

SYMBOL LEVEL RECOGNITION

The feature recognition system 52, FIG. 6, provides a symbol level test channel as a symbol level measuring means comprising a test matrix formed by impedance means or resistors 104 and 105, the summing amplifier 110, comparator 116, threshold circuit 113, resistor 106, capacitor 119, AND-gate 129, inverter 140 and bistable element 125. One of resistors 104 is connected between each of terminals $T_1$ and $T_{12}$ and the negative input terminal of summing amplifier 110 while one of resistors 105 is connected between each of terminals $T_2$–$T_7$ and $T_{11}$ and the positive input terminal of amplifier 110. Each resistor 104 may have, by way of example, equal resistance values and each resistor 105 may have also equal resistance values. The values of resistors 104 and 105 may be calculated by the following equation in which resistors 104 are each designated $R_1$ and resistors 105 are each designated $R_2$:

$$2/R_1 7/R_2$$

The resistance values are selected to permit the output of summing amplifier 110 to provide a positive output LEVEL signal which is substantially an average signal level for each waveshape. Resistor values for $R_1$ and $R_2$ may be 100 kΩ and 350 kΩ, respectively, to provide a desired output signal level. Thus, when a positive voltage waveshape is at the reference position in delay line 40, FIG. 1, and voltage signals are present at terminals $T_1$–$T_7$, $T_{11}$ and $T_{12}$, the summing amplifier will provide a positive output LEVEL signal on lead 144 representing an average quantity of ink in a symbol.

The LEVEL signal from summing amplifier 110 is provided to a comparator circuit 116 for comparison with a predetermined proportion of a stored LEVEL signal corresponding to an immediately preceding symbol. A LEVEL signal may be stored in a storage circuit which may comprise resistor 106 and capacitor 119 of FIG. 6 and be discharged during the time the next LEVEL signal representing a next waveshape is being provided as the output signal of summing amplifier 110. In the illustrated embodiment the signal is discharged to a predetermined proportion which may be approximately 50 percent of the stored LEVEL signal level at the time the comparison occurs for the immediately preceding symbol. The signal at the output of amplifier 110 is then applied to comparator circuit 116 for comparison with the predetermined proportion of a stored LEVEL signal.

One suitable comparator circuit 116 is disclosed by Richard E. Milford in U.S. Pat. No. 3,092,732, issued June 4, 1963 entitled "Maximum Signal Identifying Circuit."

The comparator circuit may consist of the portion of the circuit shown in the Figure of U.S. Pat. No. 3,092,732 comprising output terminal 43, transistor 13, input terminal 56 and control terminal 23. The storage circuit of resistor 106 and capacitor 119, FIG. 6, is connected to terminal 56 and the output of summing amplifier 110 is connected to terminal 23 such that whenever the LEVEL signal from amplifier 110 is sufficiently lower than the discharged signal, transistor 13 is nonconducting and an output signal at terminal 43 will be approximately 14 volts.

When the LEVEL signal from summing amplifier 110 exceeds the predetermined proportion of the stored LEVEL signal, transistor 13 conducts and the base to emitter junction functions as a diode such that the greater LEVEL signal from summing amplifier 110 is stored in the storage circuit. The storage circuit has a time constant selected such that during the interval of time between symbols the stored LEVEL signal is discharged to the predetermined proportion of approximately 50 percent of the stored LEVEL signal value prior to the next LEVEL signal being applied to terminal 23 for comparison. Thus, the LEVEL signal from amplifier 110 is of a level representing the quantity of ink in each symbol which is compared with a signal which has a level approximately 50 percent lower than the LEVEL signal of an immediately preceding symbol by comparator 116.

When the signal from summing amplifier 110 exceeds the stored signal, the output signal from comparator 116 is negative while whenever the LEVEL signal level from summing amplifier 110 is lower than the discharged signal level the output from comparator 116 is approximately +14 volts. The output of comparator 116 is applied to threshold circuit 113 which in turn provides an output signal corresponding in polarity to the input signal. The output signal from threshold circuit 113 is then inverted through inverter 140 to provide an enabling signal to the R input terminal of LEVEL REJECT bistable element 125 of FIG. 6 when the signal being compared is greater than a discharged signal. Bistable element 125 is thereby reset at a predetermined time during recognition of each symbol to prevent the provision of a SYMBOL REJECT signal when a symbol is detected having a sufficient quantity of ink.

Prior to the resetting of bistable element 125 high or enabling C678 and SYMBOL-PRES. signals have been provided on leads 147 and 148, respectively, from timing control 54 to enable AND-gate 129 for placing bistable element 125 in a set state at a predetermined time thereby permitting the resetting of bistable element 125 as a result of the comparison. Where the symbol being recognized has a LEVEL signal less than approximately 50 percent of the stored LEVEL signal, bistable element 125 will remain set enabling OR-gate 137. At the occurrence of an enabling READ TIME signal AND-gate 132 will be enabled providing a high or enabling SYMBOL REJECT signal.

The LEVEL signal on lead 144 from summing amplifier 110, FIG. 6, of the symbol level test channel is also applied to threshold circuit 114 which provides a SYMBOL LEVEL THRESHOLD signal on lead 145. The threshold circuit has a thresholding level which is set at a level corresponding to a minimum average level allowable for a valid symbol. The SYMBOL LEVEL THRESHOLD signal on lead 145 is applied to timing control logic block 54 for initiating timing signals for recognition of each symbol.

TIMING CONTROL

Timing control 54, FIG. 7, providing overall system timing comprises a plurality of AND-gates 151–155; a plurality of triggered bistable or flip-flop elements 160–164 designated as START, RESET, SYMBOL PRES., SAMPLE and READ TIME, respectively, a logic block 166 designated as CLOCK which may be a well-known oscillator circuit; an eight stage C COUNTER 168 comprising nine bistable or flip-flop elements 0–8 to provide control signals during symbol recognition sequences of operation; a C DECODER 170; and a symbol presence test channel having a test matrix formed by impedance means or resistors 172–181, summing amplifier 182, and threshold circuit 184.

A suitable circuit for bistable elements 160–164 is disclosed by J. P. Barlow et al. in FIG. 4 and columns 17–19 of U.S. Pat. No. 3,444,525, issued May 13, 1969, entitled "Centrally Controlled Multicomputer System."

The triggered bistable element is placed in a set or binary-1 state when a high or enabling signal is present on the S-input terminal and the signal to the T-input terminal changes to the high state. It is placed in a rest or binary-0 state when an enabling signal is present on the R-input terminal and the signal to the T-input terminal changes to the high state. When the triggered bistable element is in a set state, the signal at the "1" output terminal is an enabling level and while in a reset state the signal at the "0" output terminal is at an enabling level. In the aforementioned J. P. Barlow et al. patent, the bistable element is reset when a low or disabling signal is applied to the R′-input terminal without the presence of an enabling signal at the T-input terminal. In FIG. 7 an inverter, not shown, is assumed to be contained in each bistable element such that a high or enabling signal is applied to the R′-input terminal to reset bistable element 160.

SYMBOL PRESENCE RECOGNITION

Referring now to FIG. 7, the symbol presence test channel detects the leading portion of a waveshape as it reaches sampling tap $T_{11}$. The symbol test channel comprises the test matrix receiving input signals from each of the terminals $T_1$–$T_7$, $T_9$, $T_{11}$ and $T_{12}$, the summing amplifier 182 and the threshold circuit 184.

The voltage divider of the test matrix employs impedance means such as resistors 172–181 for resistance weighting such that when a leading portion of a waveshape reaches terminal $T_{11}$ the output signal from the summing amplifier 182 will become positive. Resistors 172–178, 179 and 181 are connected between terminals $T_2$–$T_7$, $T_9$ and $T_{12}$ and the negative input to summing amplifier 182 while resistor 180 is connected between terminal $T_{11}$ and the positive input terminal of summing amplifier 182.

Test matrix resistors 172–179 have sufficient resistance values at the negative input terminal of the summing amplifier 182 to prevent a positive output signal exceeding a predetermined threshold level from being applied to amplifier 182 until the leading portion of a waveshape reaches tap $T_{11}$. Tap $T_{11}$ is connected, by means of resistor 180, to the positive input terminal of summing amplifier 182 to cause the output signal to exceed the predetermined threshold and start providing timing signals to recognize a symbol. Resistors 172, 173–175, 176–178 and 179 may have resistance values of 261k, 2.2M, 464k and 121k, respectively.

The remaining resistor 181 of the test matrix connected between terminal $T_{12}$ and the negative input terminal of summing amplifier 182 is selected to provide a balance of the positive and negative conductances into amplifier 182. Resistors 180 and 181 may be 31.6 kΩ and 82.5 kΩ, respectively, to provide a balance for a summing amplifier having a gain of approximately 1.

The voltage divider resistor 180 between terminal $T_{11}$ and the positive input terminal to summing amplifier 182 has been selected such that the leading edge slope of a waveshape at tap $T_{11}$ will provide the first positive input to the summing amplifier and will primarily determine the time at which a 0 crossover output signal will be produced to trigger the start of timing as previously described. The resistors of the test matrix which cause recognition of the leading edge of the waveshapes representing all the symbols are uniformly timed at the time when the output signal crosses the 0 reference level. Resistors 172–178 effectively adjust the crossover point for variations in average signal level of the waveshape, while resistor 179 adjusts the crossover point for variations in amplitude of the leading portion of the waveshape. Thus, the symbol test channel providing a TIMING-THRESHOLD signal provides for moving the 0 crossover point for each waveshape to allow sampling at substantially uniform times for each waveshape.

Referring now to the circuit of FIGS. 1 and 7 it may be noted that, as the waveshape enters delay line 40, sampling point $T_1$ is first to deliver an output voltage, which is applied to the negative input terminal of summing amplifier 182. Thus, the leading portion of the waveshape provides a negative voltage from summing amplifier 182 as the waveshape progresses further along line 40. The signals from sampling points $T_2$ to $T_9$, which are added together in the parallel resistance of the test matrix or voltage divider network whose resistance becomes progressively less, become increasingly significant. Eventually, the signal at the negative input terminal of summing amplifier 182 becomes equal to the signal at the positive input terminal provided by the leading edge of the waveshape arriving at tap $T_{11}$. The output from amplifier 182 goes to 0 and becomes positive.

The change in output signal polarity of summing amplifier 182, occasioned by the advance of the waveshape leading portion or edge along delay line 40, may be employed to indicate the arrival of the waveshape in the delay line. The change in output signal polarity further provides a signal to the input of threshold circuit 184 which in turn provides a high or enabling TIMING-THRESHOLD signal on lead 186. An enabling signal on lead 186 applied to the T-input terminal of START bistable element 160 in conjunction with an enabling SYMBOL LEVEL THRESHOLD signal from the feature recognition system, FIG. 6, applied to the S-input terminal of bistable element 160 places bistable element 160 in a set state. Bistable element 160 then provides an output signal which initiates the start of timing signal generation to supply signals for a symbol recognition operation.

Since the enabling of bistable element 160 requires both a TIMING-THRESHOLD signal and a SYMBOL LEVEL THRESHOLD signal, the initiating of timing or symbol presence recognition requires that a leading edge of the waveshape corresponding to a symbol be in the reference position and also that the waveshape represent a sufficient quantity of ink to represent a symbol. In this manner, extraneous ink spots which are isolated and spurious signals, such as noise spikes, will not initiate timing due to having insufficient ink quantity.

C-counter 168 comprising nine flip-flops 0–8 provides timing signals during all signal recognition sequences of operation. The C-counter in its defined states of $C3\overline{4}5$, C678, C6, C8 and $C67\overline{8}$ is used to provide certain control signals. For example, signal $C67\overline{8}$ represents a state of C-counter 168 whenever the bistable elements corresponding to positions 6 and 7 are both in their set states and the flip-flop or bistable element in position 8 is in a reset state.

A clock output or CLK-signal from clock signal source 166 is applied to C-counter 168 to advance the counter at a predetermined interval of time corresponding to a desired clock frequency time interval. The clock signal source may be any well-known oscillator circuit and the clock frequency may be, by way of example, 1 megacycle, whereby the counter is advanced by a count of 1 for each CLK-signal occurring at a 1 megacycle rate. The CLK-signal is also applied to the T or trigger input terminal of each of bistable element 161–164 of FIG. 7.

Operation of timing control 54, as illustrated in FIG. 8, shows the waveshapes for a sequence of signals provided when reading a symbol on a document. Initially, bistable elements 160–164 are in their reset states. The waveshapes represent the signals at the 1 output terminal of each of the bistable elements of FIG. 7 and signals representing the output of threshold circuits 114 and 182 and AND-gate 155.

As previously described, START bistable element 160 is triggered to its set state, to initiate timing. When bistable element 160 is placed in its set state an enabling START signal is provided as one input to each of AND-gates 151 and 152. An enabling signal from the 0 output terminal of RESET bistable element 161 enables AND-gate 151 to in turn enable OR-gate 158 for providing an enabling signal for setting RESET bistable element 161. An enabling RESET signal on lead 80 at the 1 output terminal of the RESET bistable element 161 is then applied to the R-input terminal of RESET bistable element 161 and to a second input terminal of AND-gate 152 which is enabled to provide an enabling signal to the S-input terminals of SYMBOL PRES. bistable element 162 and SAMPLE bistable element 163 for setting bistable elements 162 and 163 at the next CLK-signal.

The high or enabling RESET signal on lead 80 is also applied to C-counter 168 for resetting all counter stages and to the S-input terminal of TEST bistable element 124, of the feature recognition system 52, FIG. 6. The TEST bistable element is thereby placed in its set state in preparation for utilizing the output of the symbol test channel as previously described.

The high or enabling RESET signal on lead 80 is further applied to the R-input terminal of each of LATCH-1 thru LATCH-9 bistable elements 60, FIG. 1, and to one input terminal of OR-gate 66 to provide an enabling signal from OR-gate 66 to the R-input terminal of LATCH-0 bistable element 60. Bistable elements 60 are thereby each placed in their reset state. Thus, the overall system is conditioned for a symbol recognition operation.

The high or enabling SYMBOL PRES. signal from the 1 output terminal of bistable element 162 is applied to the R′-input terminal of the START bistable element 160 for placing bistable element 160 in its reset state.

The high or enabling SAMPLE signal on lead 55 from the 1 output terminal of bistable element 163 is applied to one of the input terminals of AND-gates 57, FIG. 1, to enable each of AND-gates 57 which have an enabling input signal on a corresponding leads 58 from correlation recognition system 50. Each enabled AND-gate 57 transmits an enabling signal to the S-input of a respective LATCH-0 thru LATCH-9 bistable element 60. Thus, symbols recognized by correlation recognition system 50 and provided as indications in the form of enabling output signals on leads 58 are stored in bistable elements 60 for testing at a time when a high or enabling TEST or TEST NOT signal is provided from TEST bistable element 124, FIG. 6. An enabling TEST or TEST NOT signal permits determining if the symbols recognized by the correlation recognition system correspond to the features recognized by the feature recognition system. The high or enabling SAMPLE signal is also transmitted through lead 56 to one of the input terminals of AND-gate 155, FIG. 7. AND-gate 155 is enabled when a high or enabling level C345 signal is provided from C-Decoder 170 to its second input terminal to transmit an enabling TEST TIME signal through lead 146 to one of the input terminals of AND-gate 128, FIG. 6. The enabling TEST TIME signal on lead 146 is applied to one of the input terminals of AND-gate 128, FIG. 6, and a second input is provided from threshold circuits 112, to provide for performing a test for detection of incorrect symbol recognition, as previously described.

At the occurrence of an enabling C6 signal at the R-input terminal of SAMPLE bistable element 163 in conjunction with a high or enabling CLK-signal on the T-input input terminal, bistable element 163 is reset, thereby disabling AND-gate 155 and transmitting a disabling TEST TIME signal through lead 146 to one of the input terminals of AND-gate 128, to inhibit further testing of symbol recognition.

With a C678 high or enabling signal applied to one of the input terminals of AND-gate 153 in conjunction with an enabling SYMBOL PRES. signal applied to the other of its input terminals, AND-gate 153 is enabled to provide an enabling signal to the S-input terminal of the READ TIME bistable element 164. Bistable element 164 is then placed in a set state at the occurrence of the next enabling CLK-signal to provide an enabling READ TIME signal on lead 149. The high or enabling READ ENABLE signal, obtained by the concurrent occurrence of the enabled READ TIME signal and the disabled SYMBOL REJECT signal via an AND-gate 154, is applied to each of AND-gates 76 to cause high or enabling signals at terminals 78 corresponding to the SYMBOLS 0–9 recognized.

The enabling READ TIME signal is also applied to one of the input terminals of AND-gate 132, FIG. 6. In the event that an incorrect signal symbol has been recognized by the correlation recognition system or a level reject detected, as previously described, the enabling READ TIME signal enables AND-gate 132 to provide a high or enabling SYMBOL REJECT signal at terminal 72 for utilization by processing circuits.

When a high or enabling SYMBOL REJECT signal is received, it is inverted by inverter 159 to provide a low or disabling input to one of the input terminals of AND-gate 154. Disabled AND-gate 154 then transmits a low or disabling READ ENABLE signal through lead 74 to AND-gates 76 of FIG. 1 to inhibit further provision of high or enabling SYMBOL 0–SYMBOL 9 signals at terminals 78. When the SYMBOL REJECT SIGNAL is a low or disabling signal it is inverted through inverter 159 to enable AND-gate 154 when a high or enabling READ TIME signal is present to provide a high or enabling READ ENABLE signal on lead 74.

When a high or enabling C8 signal from C-Decoder 170 is applied to the R-input terminal of READ TIME bistable element 164, bistable element 164 is reset at the occurrence of the next enabling CLK-signal. A low or disabling READ TIME signal is then transmitted to one of the input terminals of AND-gate 154 for prohibiting the transmission of a high or enabling READ ENABLE signal through lead 74.

At the occurrence of a high or enabling C678 signal on lead 147 from C-Decoder 170 and the next high or enabling CLK-signal, the SYMBOL PRES. bistable element 162 is placed in a reset state. Also OR-gate 158 is enabled by the high or enabling C678 signal to provide a signal to set RESET bistable element 161 at the time of a next CLK-signal. A high or enabling RESET signal is thereby provided on lead 80 to reset the C-Counter 168, set TEST bistable element 124, and rest LATCH-0 thru LATCH-1 bistable elements as previously described. The high or enabling RESET signal is also applied to the R-input terminal of RESET bistable element 161 for resetting bistable element 161 at the occurrence of a next high or enabling CLK-signal to place timing control 54 in a condition for a next symbol recognition sequence of operations.

Thus, the system of FIG. 1 is adapted to accurately recognize symbols printed on documents having printing imperfections in the form of extraneous magnetic particles providing spurious signals to a reading transducer, symbol skew relative to the transducer, variations in ink density or ink voids in symbols, isolated ink spots appearing as symbols, and symbols having strokes with uneven edges and widths.

While the principles of the invention have been made clear in the illustrative embodiments, there will be obvious to those skilled in the art, many modifications in structure, arrangement, proportions, the elements, materials and components, used in the practice of the invention, and otherwise, which are adapted for specific environments and operating requirements, without departing from these principles. The appended claims are, therefore, intended to cover and embrace any modifications within the limits only of the true spirit and scope of the invention.

What is claimed is:

1. Apparatus for recognizing magnetic ink symbols written in human language comprising:
- means for DC magnetizing said symbols;
- an electromagnetic transducer;
- means for moving each symbol relative to said transducer;
- means coupled to said transducer for deriving a signal having a waveshape characteristic for each symbol, said waveshape characteristic of each symbol having a variable voltage amplitude representing the surface area of ink of the symbol;
- waveshape transmission means having an input terminal for receiving any one of the waveshapes and a plurality of output terminals for delivering a plurality of discrete signal samples of the received waveshape;
- a correlation recognition system for recognizing said symbols according to a pattern of predetermined voltages of said signal samples and being connected to said waveshape transmission means to receive certain of said signal samples and being responsive to provide symbol output signals corresponding to each recognized one of the waveshapes;
- a feature recognition system for recognizing said symbols according to characteristic voltage amplitudes of said signal samples corresponding to each symbol and being connected to said waveshape transmission means to receive certain of said signal samples, said feature recognition system including a waveshape voltage level measuring means for receiving said plurality of discrete signal samples of the received waveshape from said waveshape transmission means; and
- test means coupled to said systems for receiving said feature signals and said symbol output signals and being responsive to said feature signals for inhibiting recognition of a symbol when a feature signal disagrees with a symbol output signal;
- said waveshape voltage level measuring means comprising,
- a test matrix coupled to receive said signal samples,
- a summing amplifier coupled to said test matrix for providing an output level signal representative of the average signal samples voltage level of the scanned symbol,
- storage means coupled to said summing amplifier for sequentially storing the output level signal of each signal samples,
- comparison means coupled to said summing amplifier and said storage means for comparing the signal voltage level of the signal samples stored in said storage means to a subsequent signal voltage level in said waveshape transmission means being sensed by said test matrix and said summing amplifier, and
- means connected to said comparison means for detecting the presence of a subsequent waveshape having an average signal voltage level lower than a predetermined portion of the magnitude of said stored output level signal and responsive thereto for preventing the recognition of a symbol by said test means.

2. The apparatus of claim 1 wherein said test means is further responsive to said feature signal and said symbol output signal to enable recognition of a symbol when said feature signal agrees with said symbol output signal.

3. Apparatus for recognizing magnetic ink symbols comprising:
- means for magnetizing said symbols;
- an electromagnetic transducer;
- means for moving each symbol relative to said transducer;
- means coupled to said transducer for deriving a signal for each symbol having a waveshape characteristic of each symbol;
- wave transmission means having an input terminal for receiving said waveshape and a plurality of output terminals for delivering a plurality of discrete signal samples of said waveshape;
- a correlation recognition system for recognizing symbols according to a pattern of predetermined voltages of said samples and being connected to said wave transmission means for receiving certain of said signal samples and being responsive for providing a symbol output signal corresponding to each recognized one of the waveshapes;

a feature recognition system for recognizing said symbols according to characteristic voltage amplitudes of signal samples corresponding to each symbol, said feature recognition system including, summing means connected to said wave transmission means for receiving certain of said signal samples and responsive thereto for generating a summation signal representative of the summation of the characteristic voltage amplitudes of said signal samples, and further including means connected to said summing means for providing feature signals in response to said summation signal;

means responsive to feature signals and symbol output signals for providing a signal indicating incorrect recognition when disagreement occurs between said feature and symbol output signals;

means for receiving from said transducer a magnetic particle signal for each magnetic particle on said means for moving, said magnetic particle signal having a waveshape characteristic of said particle and directed to said waveshape transmission means; and a particle test means connected to said feature recognition system for receiving signal samples of said magnetic particle signal summed by said summing means in said feature recognition system and responsive thereto for generating a noise indicator signal representing the presence of magnetic particles on said means for moving when no symbol is being sensed by said transducer.

4. A system for recognizing different waveshapes comprising:

a wave transmission means having an input terminal for receiving said waveshapes and a plurality of output terminals for delivering discrete signal samples of said waveshapes;

a feature recognition system for recognizing said waveshapes according to characteristic voltage amplitudes of signal samples corresponding to different parts of each symbol and being connected to said transmission means for receiving certain of said signal samples, said feature recognition system having testing means for determining whether output signals are characteristic of one of said waveshapes, said feature recognition system including a waveshape voltage level measuring means for receiving said plurality of discrete signal samples of the received waveshape from said waveshape transmission means, said waveshape voltage level measuring means comprising, a test matrix coupled to receive said signal samples, a summing amplifier coupled to said test matrix for providing an output level signal representative of the average signal samples voltage level of the scanned symbol, storage means coupled to said summing amplifier for sequentially storing the output level signal of each signal samples, comparison means coupled to said summing amplifier and said storage means for comparing the signal voltage level of the signal samples stored in said storage means to a subsequent signal voltage level in said waveshape transmission means being sensed by said test matrix and said summing amplifier, and means connected to said comparison means for detecting the presence of a subsequent waveshape having an average signal voltage level lower than a predetermined portion of the magnitude of said stored output level signal and responsive thereto for preventing the recognition of a symbol by said test means.

5. A system for recognizing each of a plurality of different waveshapes, comprising:

a wave transmission means having an input terminal for receiving one of said waveshapes and a plurality of output terminals for delivering a plurality of discrete sample signals representative of said one of said waveshapes;

a correlation recognition system connected to said transmission means for receiving certain of said sample signals and being responsive to certain of said sample signals for providing an output signal corresponding to a recognized one of said waveshapes;

a feature recognition system connected to said transmission means for receiving certain of said sample signals and being responsive to said sample signals for determining whether said sample signals define a feature of said waveshape, said feature recognition system including a waveshape voltage level measuring means for receiving said plurality of discrete signal samples of the received waveshape from said waveshape transmission means; and test means responsive to feature signals and said output signal for inhibiting recognition of said waveshape when a feature signal disagrees with an output signal;

said waveshape voltage level measuring means comprising, a test matrix coupled to receive said signal samples, a summing amplifier coupled to said test matrix for providing an output level signal representative of the average signal samples voltage level of the scanned symbol, storage means coupled to said summing amplifier for sequentially storing the output level signal of each signal samples, comparison means coupled to said summing amplifier and said storage means for comparing the signal voltage level of the signal samples stored in said storage means to a subsequent signal voltage level in said waveshape transmission means being sensed by said test matrix and said summing amplifier, and means connected to said comparison means for detecting the presence of a subsequent waveshape having an average signal voltage level lower than a predetermined portion of the magnitude of said stored output level signal and responsive thereto for preventing the recognition of a symbol by said test means.

6. The apparatus of claim 5 wherein said test means is responsive to said feature signal and said output signal to enable recognition of said waveshape when said feature and output signals are similar.

7. Apparatus for identifying each of a plurality of different waveshapes comprising:

a waveshape transmission means for sequentially receiving each waveshape and delivering at least one separate identification signal for each waveshape received;

a waveshape voltage level measuring means for receiving said identification signal and detecting signal voltage levels, said measuring means providing a level signal representing an average signal voltage level for each waveshape;

said waveshape voltage level measuring means comprising, a waveshape voltage level measuring means for receiving said plurality of discrete signal samples of the received waveshape from said waveshape transmission means, said waveshape voltage level measuring means comprising, a test matrix coupled to receive said signal samples, a summing amplifier coupled to said test matrix for providing an output level signal representative of the average signal samples voltage level of the scanned symbol, storage means coupled to said summing amplifier for sequentially storing the output level signal of each signal samples, comparison means coupled to said summing amplifier and said storage means for comparing the signal voltage level of the signal samples stored in said storage means to a subsequent signal voltage level in said waveshape transmission means being sensed by said test matrix and said summing amplifier, and means connected to said comparison means for detecting the presence of a subsequent waveshape having an average signal voltage level lower than a predetermined portion of the magnitude of said stored output level signal and responsive thereto for preventing the recognition of a symbol by said test means.

8. Apparatus for recognizing symbols written in human language with magnetic ink comprising:

means for DC magnetizing said symbols;

an electromagnetic transducer;

means for moving each symbol relative to said transducer;

integrator means coupled to said transducer for deriving a signal for each symbol received, each signal being integrated to provide a waveshape having a variable voltage amplitude representing the total surface area of ink of the symbol represented;

a waveshape transmission means coupled to said integrator means for receiving each waveshape and propagating the waveshapes therealong, said transmission means delivering waveshape identification signals;

a level measuring means comprising, a test matrix coupled to said transmission means for receiving said identification signals and responsive to said identification signals for producing matrix signals, a summing amplifier coupled to receive said matrix signals for generating an output level signal representative of the summation of said matrix signals, a storage means for sequentially storing said output level signals, comparison means coupled to said summing amplifier and said storage means for detecting the presence of an output level signal from a subsequent waveshape having an average signal voltage level lower than a predetermined proportion of the voltage magnitude of said stored level signal, and a threshold circuit connected to said summing amplifier for generating a symbol level threshold signal representing the presence of a waveshape in said transmission means having a predetermined average signal amplitude;

a timing means coupled to said transmission means for receiving said identification signals and being responsive to said identification signals for producing a timing signal when a leading portion of each waveshape is propagated to a predetermined point in said transmission means; and means coupled to said measuring means and said timing means to receive said threshold signal and said timing signal and being responsive to said threshold and said timing signals for producing a signal to initiate an operation for recognition of said waveshape.

9. Apparatus for identifying each of a plurality of different waveshapes comprising:

a waveshape transmission means for receiving each waveshape and propagating the waveshapes therealong, said transmission means having spaced sampling taps for providing waveshape identification signals for the identification of different waveshapes;

a level measuring means comprising, a test matrix coupled to said transmission means for receiving said identification signals and for producing matrix signals, a summing amplifier coupled to receive said matrix signals for generating an output level signal representative of the summation of said matrix signals, a storage means for sequentially storing said output level signals, comparison means coupled to said summing amplifier and said storage means for detecting the presence of an output level signal from a subsequent waveshape having an average signal voltage level lower than a predetermined proportion of the voltage magnitude of said stored level signal, and a threshold circuit connected to said summing amplifier for generating a symbol level threshold signal representing an average signal level of a waveshape in said transmission means;

a timing means coupled to said receiving means for receiving said identification signals and being responsive to said identification signals for producing a timing signal when a leading portion of each waveshape is propagated to a predetermined sampling tap; and means coupled to said measuring means and said timing means and being responsive to the conjunctive presence of said threshold and timing signals for producing a signal to initiate an operation for recognition of a waveshape.

10. Apparatus for recognizing symbols written in human language with magnetic ink comprising:

means for DC magnetizing said symbols;

an electromagnetic transducer;

means for moving each symbol relative to said transducer during a recognition mode of operation, said moving means having a member disposed in close proximity to said transducer;

integrator means coupled to said transducer for deriving a signal from a magnetic particle on said member having a waveshape characteristic of said particle, said signal being integrated to provide a waveshape having a voltage amplitude representing the size of the particle;

a waveshape transmission means coupled to said integrator means for receiving said waveshape and for propagating waveshapes therealong, said transmission means generating waveshape identification signals;

summing means for receiving said waveshape identification signals and responsive thereto for generating an output signal corresponding to the summation of said waveshape identification signals;

a threshold circuit coupled to said summing means for producing a particle signal when said output signal exceeds a set voltage amplitude; and identification means responsive to said particle signal for providing an indication of an excessive amount of magnetic particles on said member when no symbol is being sensed by said transducer.

11. In an apparatus for recognizing symbols printed on a document in magnetic ink by identifying their distinctive signal waveshapes, means for detecting the presence of extraneous magnetic particles on a roller disposed in close proximity to a magnetic transducer comprising:

means for deriving from said transducer a signal for each magnetic particle on said roller having a waveshape characteristic of said particle;

a waveshape transmission means for propagating said waveshape therealong and for delivering waveshape identification signals; and a test means for receiving said waveshape identification signals and for producing a particle signal representing the presence of magnetic particles on said roller, said test means comprising, summing means for receiving said waveshape identification signals and responsive thereto for generating an output signal corresponding to the summation of said waveshape identification signals;

a threshold circuit coupled to said summing means for producing a particles signal when said output signal exceeds a set voltage amplitude; and identification means responsive to said particle signal for providing an indication of an excessive amount of magnetic particles on said member when no symbol is being sensed by said transducer.

12. The apparatus of claim 1 including means for detecting the presence of extraneous magnetic particles on said means for moving, said means for detecting comprising:

means for receiving from said transducer a magnetic particle signal for each magnetic particle on said means for moving, said magnetic particle signal having a waveshape characteristic of said particle and directed to said waveshape transmission means; and a particle test means connected to said feature recognition system for receiving signal samples of said magnetic particle signal summed by said summing means in said feature recognition system and responsive thereto for generating a noise indicator signal representing the presence of magnetic particles on said means for moving when no symbol is being sensed by said transducer.

13. The apparatus of claim 1 further comprising:

a threshold means coupled to said summing amplifier and responsive to said output level signal for producing a symbol level threshold signal representing the presence of a waveshape in said transmission means having a predetermined average signal amplitude;

a timing means coupled to said transmission means for receiving said signal samples and responsive thereto for generating a timing signal when a leading portion of each waveshape is propagated to a predetermined point in said transmission means; and means coupled to said threshold means and said timing means for receiving said threshold signal and said timing signal and responsive thereto for producing a signal to initiate an operation for recognition of said waveshape.

14. The apparatus of claim 4 including means for detecting the presence of extraneous magnetic particles on said means for moving, said means for detecting comprising:

means for receiving from said transducer a magnetic particle signal for each magnetic particle on said means for moving, said magnetic particle signal having a waveshape characteristic of said particle and directed to said waveshape transmission means; and a particle test means connected to said feature recognition system for receiving signal samples of said magnetic particle signal summed by said summing means in said feature recognition system and responsive thereto for generating a noise indicator signal representing the presence of magnetic particles on said means for moving when no symbol is being sensed by said transducer.

15. The apparatus of claim 7 including means for detecting the presence of extraneous magnetic particles on said means for moving, said means for detecting comprising:

means for receiving from said transducer a magnetic particle signal for each magnetic particle on said means for moving, said magnetic particle signal having a waveshape characteristic of said particle and directed to said waveshape transmission means; and a particle test means connected to said feature recognition system for receiving signal samples of said magnetic particle signal summed by said summing means in said feature recognition system and responsive thereto for generating a noise indicator signal representing the presence of magnetic particles on said means for moving when no symbol is being sensed by said transducer.

16. The apparatus of claim 8 including means for detecting the presence of extraneous magnetic particles on said means for moving, said means for detecting comprising:

means for receiving from said transducer a magnetic particle signal for each magnetic particles on said means for moving, said magnetic particle signal having a waveshape characteristic of said particle and directed to said waveshape transmission means; and a particle test means connected to said feature recognition system for receiving signal samples of said magnetic particle signal summed by said summing means in said feature recognition system and responsive thereto for generating a noise indicator signal representing the presence of magnetic particles on said means for moving when no symbol is being sensed by said transducer.

17. The apparatus of claim 9 including means for detecting the presence of extraneous magnetic particles on said means for moving, said means for detecting comprising:

means for receiving from said transducer a magnetic particles signal for each magnetic particle on said means for moving, said magnetic particle signal having a waveshape characteristic of said particle and directed to said waveshape transmission means; and a particle test means connected to said feature recognition system for receiving signal samples of said magnetic particle signal summed by said summing means in said feature recognition system and responsive thereto for generating a noise indicator signal representing the presence of magnetic particles on said means for moving when no symbol is being sensed by said transducer.

* * * * *